United States Patent [19]

Härer et al.

[11] Patent Number: 5,175,439

[45] Date of Patent: Dec. 29, 1992

[54] POWER SUPPLY CIRCUIT FOR MOTOR VEHICLES

[75] Inventors: Helmut Härer, Seeveatl; Gerhard Henneberger, Aachen; Jd van Wyk, Randburg, all of Fed. Rep. of Germany

[73] Assignee: Robert Bosch GmbH, Stuttgart, Fed. Rep. of Germany

[21] Appl. No.: 750,873

[22] Filed: Aug. 26, 1991

[30] Foreign Application Priority Data

Dec. 21, 1987 [DE] Fed. Rep. of Germany ......... 3743317

Related U.S. Application Data

[63] Continuation-in-part of Ser. No. 397,475, Aug. 16, 1989, now abandoned.

[51] Int. Cl.⁵ .................. H02P 9/30; H02M 7/00
[52] U.S. Cl. .................. 307/10.1; 363/37; 307/20; 307/24; 307/76; 322/4; 322/7
[58] Field of Search ............ 363/36, 37, 125, 126; 320/61, 64, 65, 66, 67, 68, 32, 43; 322/4,7, 10–17, 28; 307/9.1, 10.1, 10.7, 11, 13, 18, 19, 20, 22, 24, 28, 29, 75, 76, 78, 82, 84

[56] References Cited

U.S. PATENT DOCUMENTS

| | | | |
|---|---|---|---|
| 3,668,514 | 6/1972 | Peck | 307/28 X |
| 4,214,198 | 7/1980 | Schneider | 320/15 |
| 4,542,462 | 9/1985 | Morishita et al. | |
| 4,684,818 | 8/1987 | Carlson | 307/10.1 |
| 4,808,842 | 2/1989 | Hughes | 322/28 X |
| 4,825,139 | 4/1989 | Hamelin et al. | 320/61 X |

FOREIGN PATENT DOCUMENTS

| | | |
|---|---|---|
| 0016559 | 10/1980 | European Pat. Off. |
| 3313398 | 11/1983 | Fed. Rep. of Germany |
| 3227653 | 1/1984 | Fed. Rep. of Germany |
| 8403595 | 9/1984 | PCT Int'l Appl. |

*Primary Examiner*—Emanuel T. Voeltz
*Attorney, Agent, or Firm*—Michael J. Striker

[57] ABSTRACT

A novel vehicle power supply system is suggested which receives its voltage supply from a starter/generator which can be used as a generator in normal operation and as a starter when starting, wherein the starter/generator is connected with a 24 volt ring mains as well as with a 24 volt battery via a pulse inverter and a 300 volt DC intermediate circuit and a bidirectional converter. Additional consumers can be supplied with higher voltages than 24 volts and electric control devices can be supplied with voltage, possible via additional converters, from the bidirectional push-pull converter and the 300 volt DC intermediate network. In addition, this vehicle power supply system contains a plug receptacle with a 220 volt 50 Hz voltage.

9 Claims, 3 Drawing Sheets

POWER SUPPLY CIRCUIT FOR MOTOR VEHICLES

CROSS-REFERENCE TO RELATED APPLICATION

This application is a continuation of application Ser. No. 397,475 filed Aug. 16, 1989, now abandoned.

BACKGROUND OF THE INVENTION

The invention relates to a vehicle power supply system comprising a battery, a start/generator and a plurality of power consuming devices.

The production of electrical energy for a motor vehicle power supply system is usually effected with a three-phase generator which is connected with a voltage regulator. The voltage regulator regulates the generator output voltage to the value required for the voltage supply of the vehicle power system. Such a motor vehicle power supply system is known e.g. from DE-PS 33 13 398. Flywheel generators with asynchronous machines or permanently excited synchronous machines, which also serve as starters when starting and are operated with 12 volts, are known as generators. However, because of the low vehicle power supply voltage of approximately 12 volts and the low generator output voltage of approximately 12 volts, the designing of the machine is quite problematic, since large winding cross-sections are required as a result of the high electric current. In addition, high losses occur because of the high currents, and large and accordingly expensive semiconductor components are simultaneously required in the inverters for rectification of the alternating voltage produced in the generator and, when star for converting the direct current from the battery into an alternating current.

SUMMARY OF THE INVENTION

The object of the invention is to provide a motor vehicle power supply system, in which that the generator output voltage and the input voltage of the inverter can be substantially increased. The object of the invention is achieved by switching on an additional DC intermediate circuit connected between the starter/generator the battery and consuming devices. Accordingly, the design of the machine is simplified, and smaller winding cross-sections can be used, since the current intensity can be kept smaller at a higher voltage.

In addition, no high losses occur in the power semiconductors used in the inverters as a result of the reduced current intensity, i.e. the efficiency of the system is improved. Simultaneously, the power semiconductors can be reduced and likewise made less expensive accordingly.

Increasing the vehicle power supply from 12 to 24 volts has the advantage that the line cross-sections can be reduced. By using a preferably bidirectional converter between the vehicle power supply battery and the intermediate circuit, additional alternating voltages can be coupled out of this converter in a simple manner, e.g. a 220 volt 50 hertz alternating voltage can be coupled out which allows the operation of conventional electric generators in the vehicle.

The present invention both as to its construction so to its mode of operation, together with additional objects and advantages thereof, will be best understood from the following description of the preferred embodiments with reference to the accompanying drawings

DESCRIPTION OF THE PREFERRED EMBODIMENTS

Figure 1:
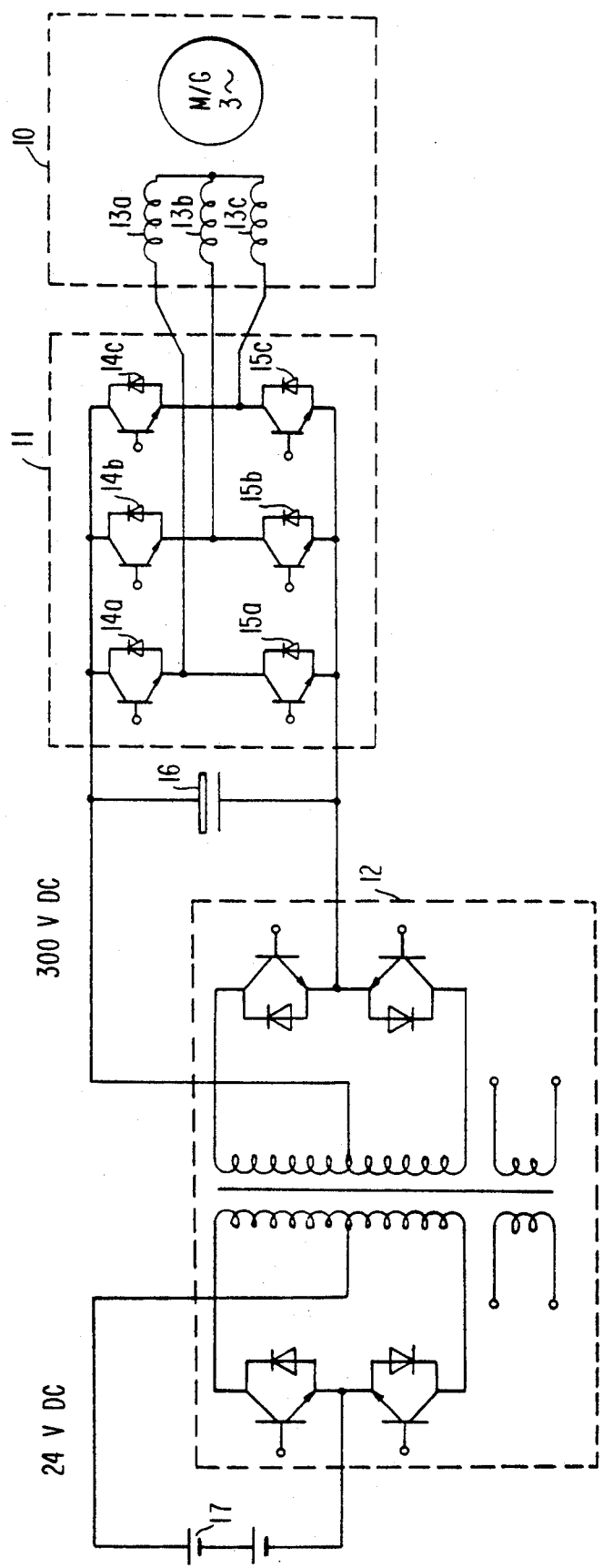
FIG. 1 shows a 24 volt DC/300 volt DC vehicle, power supply system with a flywheel starter/generator according to the invention.

The basic arrangement of a vehicle power supply system with asynchronous machine 10, a pulse inverter 11 and a bidirectional converter 12 is shown in FIG. 1.

The stator windings 13a, b, c of the asynchronous machine 10 are connected in a star connection and are connected to the pulse inverter 11 in such a way that each of the stator windings is connected between two pulse inverter elements 14 and 15, the other connections of the pulse inverter elements are connected with one another so as to be conductive and lead to a 300 volt DC intermediate circuit in which a capacitor 16 is connected in parallel with the pulse inverter elements 14 and 15. The pulse inverter elements comprise transistors and respective recovery diodes.

The 300 volt DC intermediate circuit is coupled with the 24 volt DC vehicle power supply system via a bidirectional converter 12. The 24 volt vehicle power supply system comprises only one battery 17 in this basic embodiment.

Figure 2:
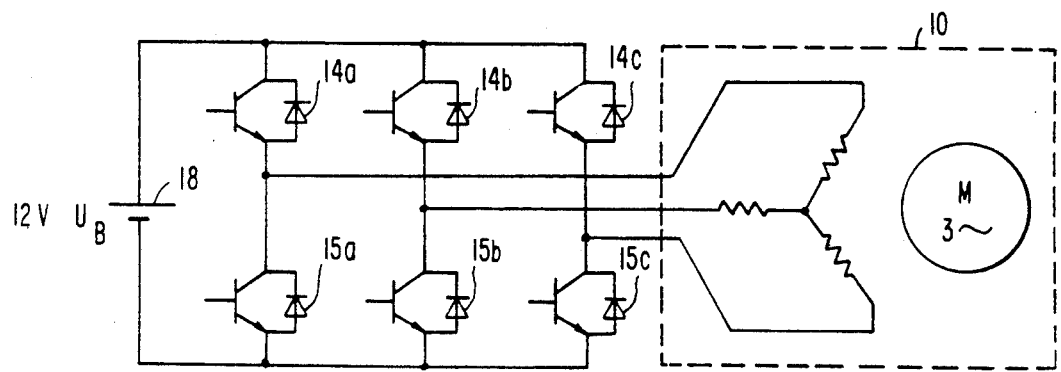
FIG. 2 shows a circuit of a flywheel starter/generator with an asynchronous machine and a pulse inverter.
Figure 3:
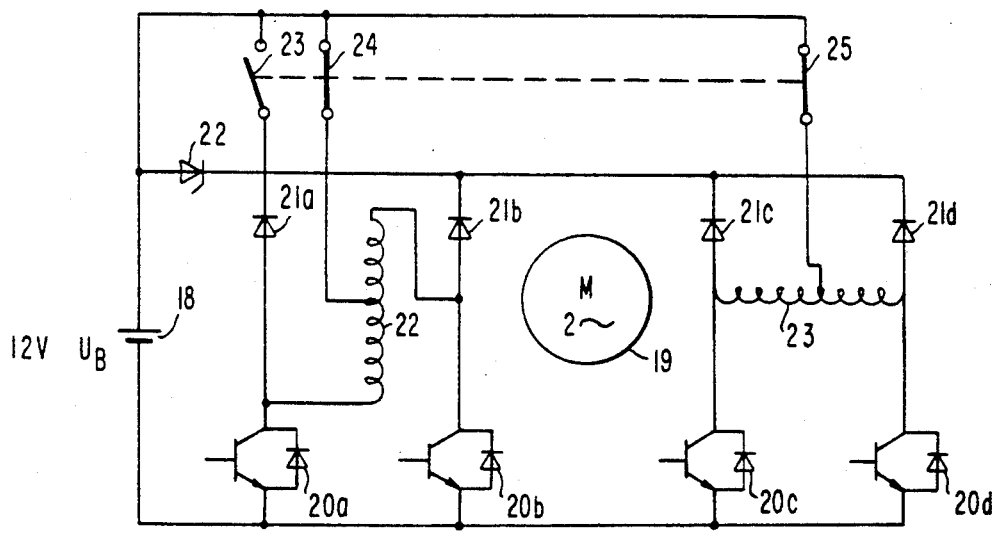
FIG. 3 shows circuit a flywheel starter/generator with a synchronous machine and a two-phase circuit.

An embodiment of an asynchronous machine, according to FIG. 1, which is connected via a pulse inverter directly with a 12 volt battery 18 as flywheel starter/generator, is shown in FIG. 2. For the rest, the functioning and manner of operation is analogous to the asynchronous machine described in FIG. 1. A permanently excited synchronous machine which is constructed e.g. with a two-phase connection or three-phase connection and is connected to a battery 18 via inverter and diodes, can also be used in principle in place of the asynchronous machine known from FIG. 2. A of a permanently excited synchronous machine with a two-phase connection 19 is shown in FIG. 3.

The stator windings 22 and 23 are connected with the negative pole of the battery 18 via four semiconductor switches 20a–d which consist of a transistor and an antiparallel connected diode; the connection with the positive pole of the battery is effected via the four diodes 21a to 21d. A Zener diode 22 is connected, in addition, in the connection line between the cathodes of these diodes and the positive pole of the battery. The positive pole of the battery can be connected directly with the cathodes of the diodes 21a to 21d and with the center taps of the windings 22 and 23 via switches 23, 24 and 25.

Figure 4:
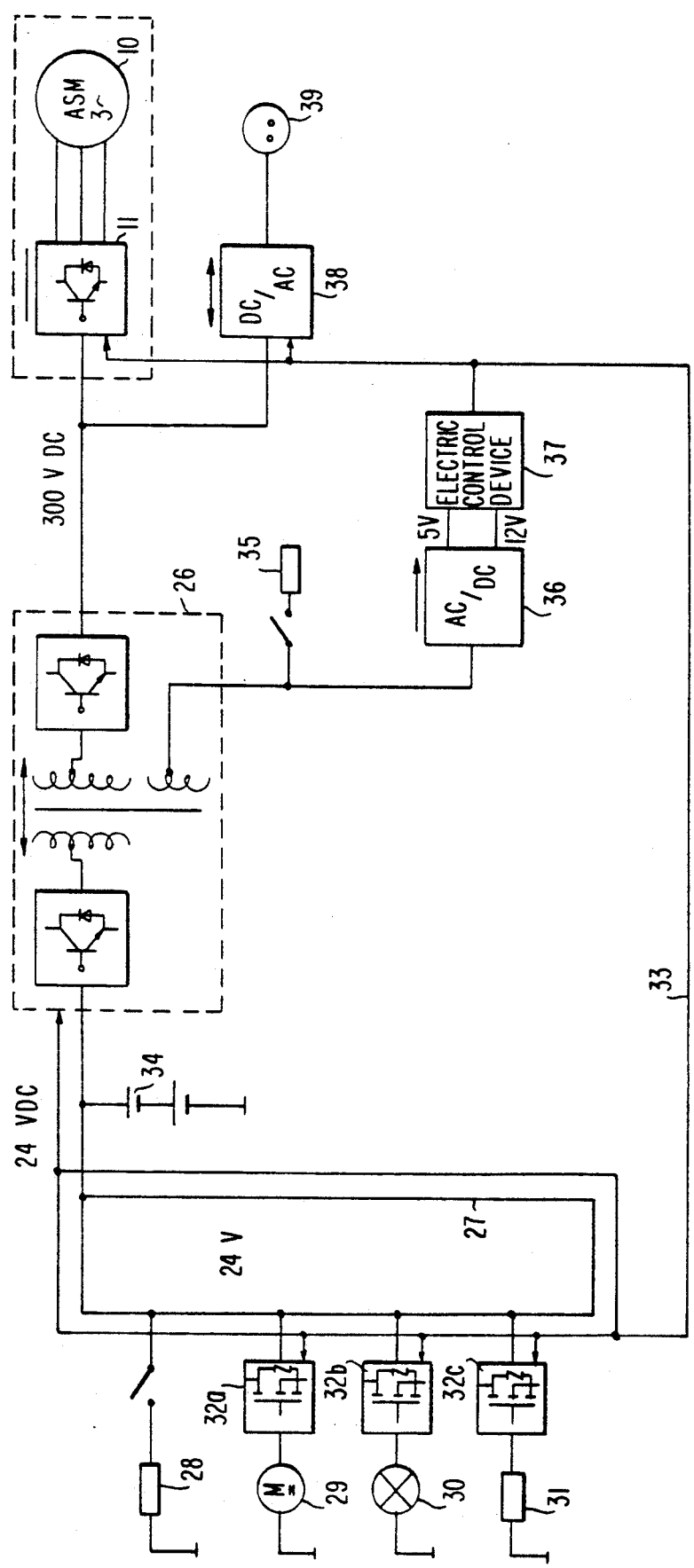
FIG. 4 shows a power supply configuration with 24 volt DC/300 volt DC with multiplex and asynchronous motor flywheel starter/generator.

An embodiment example of a complete vehicle power supply configuration with multiplex and asynchronous machine as flywheel starter/generator is shown in FIG. 4.

The three phase windings of the asynchronous motor 10 are connected with the pulse inverter 11. Another connection line leads from the pulse inverter 11 to the bidirectional push-pull converter 26 and further to a 24 volt ring mains 27 to which regulated and unregulated devices, 29, 30 and 31 are connected. The consumer devices are connected and regulated via controlled power semiconductors 32 and triggered via a data loop 33 (multiplex). A battery 34 is connected between the output of the bidirectional push-pull converter, which is connected with the 24 volt consumers devices, and ground.

An 80 volt 20 kHz voltage for the window heater coupled out of the bidirectional push-pull converter 26; the same line is used for the voltage supply of the electronic control devices 37 via an AC/DC converter 36. A DC/AC converter 38 is connected with the output of the flywheel starter/generator 10, 11, on one hand, and with one or possibly more electronic control devices 37 via the data loop 33, on the other hand. Another line leads from this converter to a plug receptacle 39 with 220 volts and 50 Hz.

The functioning of the vehicle power supply configuration is explained with reference of FIGS. 1 and 4.

In normal operation, a 300 volt alternating voltage is produced in the asynchronous machine 10 which is converted to a 300 volt DC voltage in the pulse inverter 11. This 300 volt DC voltage connects to the capacitor 16 and is chopped on the primary side of the bidirectional converter into a high-frequency alternating voltage which is transformed on the secondary side to 24 volts and is rectified again. Accordingly, a 24 volt DC voltage which is applied to the battery 17 and 34 occurs on the secondary side of the bidirectional converter. The 24 volt ring mains and the regulated and unregulated 24 volt consumers are supplied with this 24 volt DC voltage via a multiplex system. The data loop 33, which connects the individual vehicle power supply systems with one another and leads to an electronic control device, enables an independent control of the individual systems. An additional alternating voltage is coupled out via an additional winding on the primary side of the bidirectional push-pull converter, which additional alternating voltage directly supplies the window heater. The electronic control device 37 is supplied from the same winding via a DC voltage converter 36. In addition, a 220 volt, 50 Hz alternating voltage is used via another converter 38 for running a plug receptacle 39 in the vehicle.

When starting, the flywheel starter/generator 10, 11 is operated as a starter; it is supplied with power from the battery 34 via the bidirectional push-pull converter 26 and the pulse inverter 11. Thus, either power can be transmitted from the generator into the vehicle power supply system and the battery, respectively, or, conversely, power can be transmitted from the battery into the starter, when starting, by using the bidirectional push-pull converter.

Individual components can also be used instead of a flywheel starter/generator, e.g. a permanently excited preliminary starter designed for vehicle power supply voltage and an asynchronous or synchronous generator can be used for higher voltage.

While the invention has been illustrated and described as embodied in a motor vehicle power supply circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapted it for various applications without omitting features that, from the standpoint of prior art, fairly constitute essential characteristics of the generic of specific aspects of this invention.

What is claimed as new and desired to be protected by Letters Patent is set forth in the appended claims.

1. A motor vehicle power supply circuit with a plurality of power supply components, comprising a motor vehicle power supply voltage including a battery; a starter/generator; a DC voltage intermediate circuit having an increased voltage relative to the motor vehicle power supply voltage; a bidirectional converter, said battery being connected with said starter/generator through said DC voltage intermediate circuit and said bidirectional converter; a number of consumers; mains connected with said starter/generator through said bidirectional converter and also connected with said consumers; and a control device connected with said converter so that said consumers are subjected to different voltages via said control device, said consumers being located between said battery and mains.

2. A motor vehicle power supply circuit according to claim 1, further comprising a pulse inverter connected between said starter/generator and said DC voltage intermediate circuit, said pulse inverter having the same output voltage as said DC voltage intermediate circuit.

3. A motor vehicle power supply circuit according to claim 1 wherein said starter/generator has a plurality of windings connected in a star connection.

4. A motor vehicle power supply circuit according to claim 1, further comprising additional consumers operable with a 220 volt alternating voltage connected via a DC/AC converter with said DC voltage intermediate circuit.

5. A motor vehicle power supply circuit according to claim 1, wherein said starter/generator comprises an asynchronous machine.

6. A motor vehicle power supply circuit according to claim 1, wherein said starter/generator comprises a synchronous machine having one of two-phase and three-phase connections.

7. A motor vehicle power supply circuit according to claim 1, wherein said starter/generator comprises two separate electric machines.

8. A motor vehicle power supply circuit according to claim 1, wherein said starter/generator is formed as a flywheel stator generator.

9. A motor vehicle power supply circuit according to claim 2, wherein said increased voltage is substantially 300 volts.

* * * * *